United States Patent [19]

Higuchi et al.

[11] Patent Number: 4,756,180

[45] Date of Patent: Jul. 12, 1988

[54] METHOD OF HOT ROLLING FOR IRON AND IRON ALLOY RODS

[75] Inventors: Matsuo Higuchi; Tatsuya Nishimoto; Eiji Kamijo; Fumio Ono; Ikuji Uemura, all of Itami, Japan

[73] Assignee: Sumitomo Electric Industries, Ltd., Osaka, Japan

[21] Appl. No.: 850,447

[22] Filed: Apr. 9, 1986

Related U.S. Application Data

[63] Continuation-in-part of Ser. No. 648,279, Sep. 7, 1984, abandoned.

[51] Int. Cl.$^4$ .................. B21B 1/16; B21B 27/02
[52] U.S. Cl. ........................ 72/199; 29/132; 72/366
[58] Field of Search ............ 72/365, 366, 199; 29/132

[56] References Cited

FOREIGN PATENT DOCUMENTS

| | | | |
|---|---|---|---|
| 2536354 | 3/1976 | Fed. Rep. of Germany | 29/132 |
| 78-216 | 7/1978 | Japan . | |
| 112135 | 8/1980 | Japan | 72/467 |
| 109519 | 7/1982 | Japan | 72/467 |
| 21580 | 2/1984 | Japan . | |
| 1289730 | 9/1972 | United Kingdom | 72/447 |

OTHER PUBLICATIONS

*The Making, Shaping and Treating of Steel*, seventh edition, United States Steel, 1957, pp. 678–679.

*Primary Examiner*—Robert L. Spruill
*Assistant Examiner*—Steven B. Katz
*Attorney, Agent, or Firm*—Wenderoth, Lind & Ponack

[57] ABSTRACT

A novel method of hot rolling iron and iron alloy rods, using a hot rolling tool comprising $\beta$-$Si_3N_4$ and a sintering aid selected from the group consisting of $Al_2O_3$, AlN, MgO, $Y_2O_3$ and $ZrO_2$, and having a sintered density of 90% or more, Rockwell hardness of 88 or more and a mean particle size of $2\mu$ or less.

4 Claims, No Drawings

METHOD OF HOT ROLLING FOR IRON AND IRON ALLOY RODS

CROSS-REFERENCE TO RELATED APPLICATION

The present application is a continuation-in-part of Ser. No. 648,279 filed Sept. 7, 1984, now abandoned.

BACKGROUND OF THE INVENTION

The present invention relates to a method of hot rolling rods such as iron rods and iron alloy rods.

Cemented carbides and die steel have been used as hot rolling tools for iron and iron alloy rods.

However, the production conditions of mass produced articles represented by wire drawing rolls and the like have become severer year after year due to demand for higher precision and greater economical efficiency. Also, for plastic deformation tools, the demand is increasing for improved resistance to heat, wear, thermal shock and the like.

In order to meet the demand, new materials are being developed one after another in the field of cemented carbide, die steel, high-speed steel and the like. However, new materials having the aforesaid characteristics have not yet been found.

As described hereinbefore, the materials of hot rolling tools generally comprised steels such as tool steel and cemented carbide. There has been very little progress in the development of new materials for hot rolling tools.

On the contrary, since its characteristics such as shock resistance, thermal shock resistance and brittleness are inferior to those of the aforesaid materials, ceramics are beginning to be used only in the field of guide rolls and the like subjected to relatively small stress. Thus, the idea of employing ceramics as materials of rolling rolls has scarcely been conceived heretofore.

That is to say, although rolling rolls as hot rolling tools are disclosed in Japanese Patent Laid-Open No. 53-78216 (1978), the conditions under which they are employed and the effects obtained thereby are not disclosed at all.

SUMMARY OF THE INVENTION

The present inventors have arrived at the invention after a series of tests on the possibility of using ceramics as materials of hot plastic deformation tools.

That is to say, the present invention relates to a novel method of hot rolling for iron and iron alloy rods in which use is made of a hot rolling tool formed of a sintered compact comprising $\beta$-$Si_3N_4$, which is one of the silicon nitride type ceramics, and a sintering aid selected from the group consisting of $Al_2O_3$, AlN, MgO, $Y_2O_3$ and $ZrO_2$, and having a sintered density of 90% or more, Rockwell hardness of 88 or more and a mean particle size of $2\mu$ or less, and which is obtained by a hot pressing method or a normal pressure sintering method.

DESCRIPTION OF THE PREFERRED EMBODIMENTS

Silicon nitride, since it is one of the ceramic materials, is not free from the aforesaid disadvantages intrinsic to ceramics. In respect of wear resistance, however, silicon nitride excels over the aforedescribed metal materials, the wear resistance thereof particularly at high temperatures being 10 to 100 times as high as that of the conventional metal materials. Thus, the plastic deformation tools according to the present invention exhibit a high effect as hot rolling rolls for use at high temperatures.

According to the general conception of the conventional deformation tools, the useful life thereof was relatively short. Therefore, the process and equipment were designed in accordance with this general conception.

The hot rolling tools according to the present invention have a useful life 10 to 100 times that of the conventional tools, and therefore make it possible to include repair of the tools in the periodical repair program of the whole equipment. This in turn makes it possible to completely obviate the unproductive circumstances of having to stop the whole equipment frequently for the replacement of the tools.

As a result, not only the working ratio of the equipment is improved, but also the decrease in stocks arising in the process can be prevented and holding a large number of tools becomes unnecessary. Thus, the hot rolling tools according to the present invention exhibit a very high effect.

That is to say, the hot rolling tool for iron and iron alloy rods used in the present invention is characterized by a sintered compact mainly comprising $\beta$-$Si_3N_4$ and containing a sintering aid selected from the group consisting of $Al_2O_3$, AlN, MgO, $Y_2O_3$ and $ZrO_2$, and having a sintered density of 90% or more, Rockwell hardness of 88 or more and a mean particle size of $2\mu$ or less.

According to the present invention, firstly it is essential that the tools are composed of materials in which the deposition phenomenon is infinitesimal. In fact, ceramics have smaller depositability compared with metals.

The most popular alumina ceramics are not suitable for use in plastic deformation in which the tools are subjected to high stress and heavy shocks since said ceramics are less reliable due to their low strength.

In addition, although various kinds of improvement have been made for alumina in thermal shock resistance, a completely sufficient result has not been achieved. So far thermal shock resistance of merely 200° to 300° C. has been reached.

After a series of tests of various ceramic tools, it has been found that ceramics chiefly comprising $Si_3N_4$ exhibit higher properties than the conventionally used cemented carbides and die steel as materials of hot rolling tools for iron and iron alloy rods.

It has also been obvious that it is impossible to extend the useful life of tools due to the generation of the reaction of $Si_3N_4$ with Fe and the like unless a linear speed over 2 m/sec can be adopted as a rolling condition, whereby being incapable of practically using the tools.

The best efficiency can be obtained when the diameter of a rod to be obtained by using hot rolling tools of the present invention is in the range of 5–50 mm. Area reduction ratio at the time of rolling is preferably in the range of 15–35%.

That is to say, $Si_3N_4$ could not be applied to rolling of iron and iron-base alloy rods until the aforesaid rolling condition is provided.

With regard to $Si_3N_4$ used as the chief material in the present invention, there are known two production methods, i.e. the reaction sintering method in which pressed bodies of Si metal powder are nitrified, and the powder metallurgical method in which $Si_3N_4$ and additives are mixed and then the resulting mixture is sintered at normal pressure or hot pressed.

The former method, however, is not suitable for the present invention since it permits porosity to remain being 18%, the rolling speed being 25 m/sec, and the temperature being about 850° C. The rolling amount until the useful life of the rolls expired and the cause of such expiration are as shown in Table 1.

TABLE 1

|   | Composition | Particle size ($\mu$) | Density (%) | Hardness | Rolling Temperature (°C.) | Rolling amount (ton) | Cause of expiration of life |
|---|---|---|---|---|---|---|---|
| 1 | $95Si_3N_4$—$5MgO$ | 1.8 | 99 | 90 | 500 | 1200 | Wear |
| 2 | $85Si_3N_4$—$15Al_2O_3$ | 1.0 | 93 | 89 | " | 1350 | " |
| 3 | $85Si_3N_4$—$10Al_2O_3$—$5Y_2O_3$ | 1.2 | 98 | 92 | " | 1520 | " |
| 4 | $92Si_3N_4$—$2MgO$—$6Al_2O_3$ | 1.5 | 98 | 91 | " | 1480 | " |
| 5 | $92Si_3N_4$—$2MgO$—$6ZrO_2$ | 1.2 | 97 | 91 | " | 1300 | " |
| 6 | $92Si_3N_4$—$2AlN$—$6Al_2O_3$ | 1.0 | 99 | 92 | " | 1200 | " |
| 7 | $92Si_3N_4$—$2MgO$—$6Y_2O_3$ | 1.2 | 98 | 91 | " | 1500 | " |
| 8 | $98Si_3N_4$—$1MgO$—$1Al_2O_3$ | 1.0 | 98 | 93 | " | 1430 | " |
| 9* | $55Si_3N_430Al_2O_3$—$15ZrO_2$ | 1.8 | 92 | 89 | " | 250 | " |
| 10* | $50Si_3N_4$—$20Al_2O_3$—$30MgO$ | 2.6 | 89 | 86 | " | 140 | Crack |

*marks in the above table show the cases other than the present invention.

over 10%.

In addition, as to the hardness of the sintered compact, Rockwell hardness of 88 or more in A-scale is required. The reason for this is that if the hardness is less than 88, the abrasion resistance required for a tool cannot be secured, thereby remarkably reducing tool life, and it is necessary for maintaining the hardness to increase the density of the sintered compact and maintain a crystalline particle size at small values. That is, it is necessary to maintain the particle size at $2\mu$ or less. If it is more than $2\mu$ or more, the abrasion resistance is insufficient and the sintered compact is insufficient in strength.

$Si_3N_4$ of $\beta$-type crystal form leads to higher strength and more stabilized performance.

In addition, if necessary, $Si_3N_4$ having the sintered density of 97% or more and Rockwell hardness of 90 or more can be used as a still more superior tool.

Furthermore, as to the strength of the sintered compact, a mean bending strength of 50 kg/mm$^2$ or more is required. If the strength of the sintered compact is lower, the generation of split damages due to the change of load in the rolling process and the like occur. As a result, there is some cases where the sintered compact cannot be stably used. In particular, these are important factors in the case where the sintered compact is used in rough rolling.

In addition, in the rolling of iron and iron alloy rods the oxidation resistance of a tool has a remarkable influence upon the tool life. Accordingly, an oxidation resistance is required such that the weight increase during oxidation in the air is 0.1 g/m$^2$ hr or less.

Although the foregoing description relates to use of $Si_3N_4$ in rolling rolls, it is of course apparent that similar effects can also be achieved in the case where $Si_3N_4$ is used for guide rolls or similar rolls used in a roll inlet.

The present invention will hereinunder be described in more detail with reference to the following examples.

EXAMPLE 1

Various kinds of additive were blended with commercially available $Si_3N_4$ at ratios as shown in Table 1 and the resulting mixture was sufficiently pulverized by a ball mill. The mixture thus obtained was pressed under a pressure of 1 t/cm$^2$ and sintered under 1 atmospheric pressure of nitrogen at 1,800° C. for 1 hour to produce rolling rolls for iron and steel.

In this case, rolling rolls thus obtained are ones of the final step for a block mill. With these rolls a wire having a diameter of 7 mm was rolled, the area reduction ratio

EXAMPLE 2

The rolling roll having the composition of $85Si_3N_4$-$10Al_2O_3$-$5Y_2O_3$ shown in Table 1 produced in Example 1 was used in rolling at various linear speeds together with the conventional cemented carbide roll. The results are shown in Table 2.

It was proved from Table 2 that the useful life of the conventional cemented carbide roll is dependent upon linear speed more greatly than that of the rolling roll according to the present invention, and the latter becomes larger than the former at linear speeds over 2 m/sec.

TABLE 2

| Mill No. | Linear Speed (m/sec) | Useful Life of Cemented Carbide Roll (t/caliber) | Useful Life of $Si_3N_4$-roll of the invention (t/caliber) |
|---|---|---|---|
| 8 | 1.5 | 4000 | 3000 |
| 12 | 3 | 4000 | 10000 |
| 17 | 10 | 1000 | 5000 |
| 21 | 20 | 700 | 3000 |
| 24 | 25 | 400 | 1500 |

EXAMPLE 3

From a mixture of 80 weight % commerically available $Si_3N_4$, 10 weight % SiC, 5 weight % $Y_2O_3$ and 5 weight % MgO were produced guide rollers for steel in the same manner as in Example 1. The sintering temperature was 1,700° C.

A comparative test was made to compare the useful life of the guide rollers of this Example with that of the commercial cemented carbide rollers and that of alumina ceramic guide rollers. The results are as shown in Table 3. It is apparent that the guide rollers according to this Example are by far the best.

The speed of the rods was 15 m/sec and the temperature was 900° C.

TABLE 3

|   | Rolling Amount (ton) | Cause of Expiration of Life |
|---|---|---|
| Rolls of Example | 15000 | Wear |
| Cemented Carbide Rolls | 2000 | Surface Roughness |
| Alumina Ceramic Rolls | 2900 | Crack |

EXAMPLE 4

Having rolled iron rods at a 22% area reduction ratio into rods of various diameters using as finishing rolls the rolling roll having the composition of $85Si_3N_4$-$10Al_2O_3$-$5Y_2O_3$ shown in Table 1, the following results were obtained as shown in Table 4. The speed of the rods was set at 5 m/sec and the temperature was 900° C.

TABLE 4

| No. | Diameter of Rod (mm) | Rolling Amount (ton) |
| --- | --- | --- |
| 1 | 3 | 200 |
| 2 | 5 | 1500 |
| 3 | 20 | 25000 |
| 4 | 40 | 100000 |
| 5 | 50 | 100000 |
| 6 | 70 | 50000 |

According to this Example, it is found that the rolling amount can be especially high when the finished diameter of the rod is in the range of 5–50 mm. But in the case of rolling rods with a diameter below 5 mm, drawing by die proved to be more effective and this was not practical. It is also found that when the rod diameter is over 50 mm, shock at the time of engaging the edge of the rod becomes extremely large, thus lowering the rolling amount of the rolls.

EXAMPLE 5

The rolling roll having the composition of $85Si_3N_4$-$10Al_2O_3$-$5Y_2O_3$ shown in Table 1 was produced, and by rolls thus produced rods of various properties were rolled. In this case, rolling rolls thus obtained are ones of the final step for a block mill and a rod of 7 mm in diameter was rolled by these rolls, the area reduction ratio being 18%, the rolling speed being 25 m/sec, and the temperature being about 850° C.

Rolling amount before expiration of life by respective rolls and cause of their expiration are shown in Table 5.

TABLE 5

| Kind of Steel | Rolling Amount (ton) | Cause of Expiration of Life |
| --- | --- | --- |
| SUS | 1000 | Wear |
| Carbon steel (0.8% C) | 1500 | Wear |
| Si—Mo Steel | 1200 | Wear |

EXAMPLE 6

A sintering aid as shown in Table 6 was added to $Si_3N_4$ powders on the market (of $\alpha$-type having a mean particle size of $0.4\mu$, and the resulting mixture was sintered for 30 min. to 5 hours in a nitrogen gas atmosphere of 1 to 9 atm. at sintering temperatures of 1,650° to 1,900° C. with the production of hot rolling rolls having the characteristics as shown in Table 6.

The resulting rolls were tested on the rolling of iron and iron alloy rods at a rolling temperature of 850° C. until the expiration of life, with the results of rolling amount until the expiration of life as shown in Table 6.

TABLE 6

| | Composition | Density (%) | Particle size ($\mu$) | Hardness | Bending strength (kg/mm$^2$) | Crystalline substance | Roll life (t/caliber) |
| --- | --- | --- | --- | --- | --- | --- | --- |
| 11 | $85Si_3N_4$—$10Al_2O_3$—$5Y_2O_3$ | 98 | 1.2 | 92 | 80 | $\beta$-$Si_3N_4$ | 1500 |
| 12 | $85Si_3N_4$—$10Al_2O_3$—$5Y_2O_3$ | 96 | 0.8 | 93 | 60 | $\beta$-$Si_3N_4$ | 1620 |
| 13* | $85Si_3N_4$—$10Al_2O_3$—$5Y_2O_3$ | 89 | 0.6 | 88 | 40 | $\beta$-$Si_3N_4$,$\alpha$-$Si_3N_4$ | Crack |
| 14* | $85Si_3N_4$—$10Al_2O_3$—$5Y_2O_3$ | 98 | 2.8 | 91 | 60 | $\beta$-$Si_3N_4$ | 350 |
| 15* | $85Si_3N_4$—$10Al_2O_3$—$5Y_2O_3$ | 92 | 2.5 | 87 | 35 | $\beta$-$Si_3N_4$ | Crack |
| 16* | $85Si_3N_4$—$10Al_2O_3$—$5Y_2O_3$ | 92 | 0.8 | 90 | 45 | $\beta$-$Si_3N_4$,$\alpha$-$Si_3N_4$ | " |
| 17* | $85Si_3N_4$—$10Al_2O_3$—$5Y_2O_3$ | 91 | 0.8 | 86 | 40 | $\alpha$-$Si_3N_4$ | " |
| 18 | $92Si_3N_4$—$2MgO$—$6Al_2O_3$ | 98 | 1.4 | 92 | 70 | $\beta$-$Si_3N_4$ | |
| 19* | $92Si_3N_4$—$2MgO$—$6Al_2O_3$ | 92 | 2.5 | 90 | 65 | $\beta$-$Si_3N_4$ | 400 |

*marks show the cases other than the present invention.

We claim:

1. A method of hot rolling for iron and iron alloy rods, which comprises hot rolling iron or iron alloy rods having a diameter of 5 to 50 mm at a rolling speed of 2 m/sec or more using as a hot rolling tool a sintered body consisting essentially of $\beta$-$Si_3N_4$ as the main component and at least one sintering aid selected from the group consisting of $Al_2O_3$, $AlN$, $MgO$, $Y_2O_3$ and $ZrO_2$, and having a sintered density of 90% or more, Rockwell hardness of 88 or more and a mean particle size of $2\mu$ or less.

2. The method according to claim 1, wherein the sintered density is 97% or more, and the Rockwell hardness is 90 or more.

3. The method according to claim 2, wherein the tool has a mean bending strength of 50 kg/mm$^2$ or more.

4. The method according to claim 1, wherein the tool has a mean bending strength of 50 kg/mm$^2$ or more.

* * * * *